United States Patent
Siddell

(10) Patent No.: US 9,681,637 B2
(45) Date of Patent: *Jun. 20, 2017

(54) CROWD GATE CONTROL SYSTEM AND METHOD

(71) Applicant: Technologies Holdings Corp., Houston, TX (US)

(72) Inventor: James D. Siddell, Waunakee, WI (US)

(73) Assignee: Technologies Holdings Corp., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/068,842

(22) Filed: Mar. 14, 2016

(65) Prior Publication Data

US 2016/0192612 A1    Jul. 7, 2016

Related U.S. Application Data

(63) Continuation of application No. 14/561,610, filed on Dec. 5, 2014, now Pat. No. 9,357,745, which is a continuation of application No. 12/857,215, filed on Aug. 16, 2010, now Pat. No. 8,955,459.

(60) Provisional application No. 61/356,998, filed on Jun. 21, 2010.

(51) Int. Cl.
*A01K 1/00* (2006.01)
*A01K 1/12* (2006.01)

(52) U.S. Cl.
CPC .............. *A01K 1/0029* (2013.01); *A01K 1/12* (2013.01); *A01K 1/126* (2013.01)

(58) Field of Classification Search
CPC .... A01K 15/006; A01K 15/02; A01K 15/027; A01K 15/028; A01K 15/029; A01K 15/04; A01K 3/002; A01K 3/005; A01K 1/12; A01K 1/126; A01K 1/0029; A01K 1/0017; A01K 1/0041; A01K 3/00
USPC .... 119/14.03–14.04, 14.14, 14.08, 524, 510, 119/502

See application file for complete search history.

(56) References Cited

U.S. PATENT DOCUMENTS

| | | | |
|---|---|---|---|
| 3,805,714 A | 4/1974 | Thompson et al. | |
| 3,921,586 A | 11/1975 | Sweeney et al. | |
| 4,445,460 A | 5/1984 | Stencil | |
| 5,009,191 A | 4/1991 | Joergensen et al. | |
| 6,209,492 B1 | 4/2001 | Rankin | |
| 6,341,582 B1 | 1/2002 | Gompper et al. | |
| 8,955,459 B2 * | 2/2015 | Siddell | A01K 1/0029 119/510 |

(Continued)

FOREIGN PATENT DOCUMENTS

| | | | |
|---|---|---|---|
| GB | 1372355 | 10/1974 | |
| GB | 1372355 A | * 10/1974 | A01K 1/12 |

*Primary Examiner* — Joshua Huson
(74) *Attorney, Agent, or Firm* — Baker Botts L.L.P.

(57) ABSTRACT

A crowd gate control system includes a holding pen for dairy livestock, wherein the holding pen is adjacent to an entrance to a milking parlor. The system further includes a crowd gate positioned at a side of the holding pen. The crowd gate moves in relation to the entrance to the milking parlor. A controller is initiates a first mode of operation of the crowd gate prior to the crowd gate reaching the entrance to the milking parlor. The first mode of operation is a pre-forward reverse step. The crowd gate moves away from the entrance to the milking parlor prior to initiating movement towards the entrance.

13 Claims, 3 Drawing Sheets

(56) References Cited

U.S. PATENT DOCUMENTS

| | | |
|---|---|---|
| 2006/0249083 A1 | 11/2006 | Johansson et al. |
| 2007/0288249 A1 | 12/2007 | Rowe et al. |
| 2008/0184936 A1 | 8/2008 | Petterson et al. |
| 2010/0236487 A1 | 9/2010 | Stellnert et al. |
| 2010/0282171 A1 | 11/2010 | Lindstrom |
| 2010/0307420 A1 | 12/2010 | Axelsson et al. |
| 2010/0313812 A1 | 12/2010 | Waterlander |
| 2011/0023795 A1 | 2/2011 | Huls |

\* cited by examiner

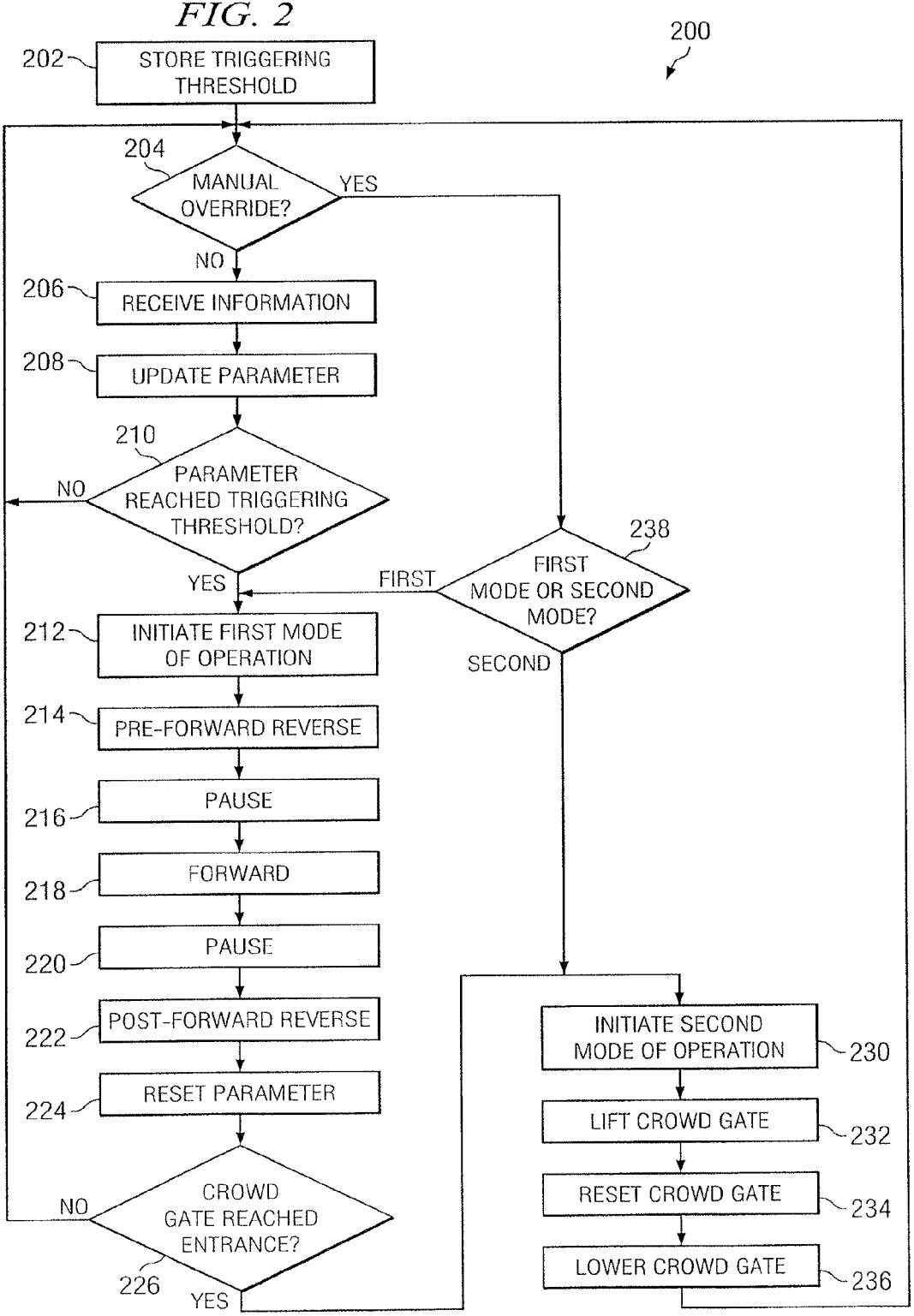

CROWD GATE CONTROL SYSTEM AND METHOD

CROSS-REFERENCE TO RELATED APPLICATION

This application is a continuation of U.S. Ser. No. 14/561,610 filed Dec. 5, 2014, entitled "Crowd-Gate Control System and Method," which is a continuation of U.S. Ser. No. 12/857,215 filed Aug. 16, 2010 entitled "Crowd-Gate Control System and Method," which is now U.S. Pat. No. 8,955,459 issued Feb. 17, 2015, which claims the benefit of priority under 35 U.S.C. §119(e) of U.S. Provisional Application 61/356,998 filed Jun. 21, 2010 the disclosure of each is hereby incorporated by reference herein.

TECHNICAL FIELD OF THE DISCLOSURE

This disclosure relates generally to crowd gates, and, more particularly, to a system and method for crowd gate control.

BACKGROUND OF THE DISCLOSURE

Over time, the size and complexity of dairy milking operations has increased. Accordingly, the need for efficient and scalable systems and methods that support dairy milking operations also has increased. Systems and methods supporting dairy milking operations, however, have proven inadequate in various respects.

SUMMARY OF THE DISCLOSURE

In accordance with the teachings of the present disclosure, disadvantages and problems associated with previous systems and methods supporting dairy milking operations can be reduced or eliminated by providing a crowd gate control system and method.

According to an exemplary embodiment of the present disclosure, a crowd gate control system includes a holding pen for dairy livestock, a crowd gate, and a controller. The holding pen is adjacent to an entrance to a milking parlor. The crowd gate is operable to form a side of the holding pen and move in relation to the entrance to the milking parlor along an axis substantially parallel to two other sides of the holding pen. The controller is operable to store a triggering threshold associated with a counter related to the milking parlor, determine whether the counter has reached the triggering threshold, and initiate a first mode of operation of the crowd gate in response to determining that the counter has reached the triggering threshold.

According to another exemplary embodiment of the present disclosure, a method for controlling a crowd gate includes storing a triggering threshold associated with a counter related to a milking parlor for dairy livestock. The milking parlor includes an entrance located adjacent to a holding pen, and a crowd gate is operable to form a side of the holding pen. The method includes determining whether the counter has reached the triggering threshold and initiating a first mode of operation of the crowd gate in response to determining that the counter has reached the triggering threshold. The crowd gate also is operable to move in relation to the entrance to the milking parlor along an axis substantially parallel to two other sides of the holding pen.

Various embodiments of the present disclosure may provide various technical advantages. One advantage is the ability to provide a crowd gate control system and method. Another advantage is to automatically engage a crowd gate in a series of movements that encourage dairy livestock to move towards an entrance to a milking parlor. The crowd gate may move without startling, agitating, and/or harming the dairy livestock. Accordingly, dairy livestock may be trained over time to move forward towards the entrance to the milking parlor on their own. Another technical advantage may be to automatically determine when and/or how long to move the crowd gate. For example, movement of the crowd gate may be based on the number of dairy livestock remaining in the holding pen. Yet another advantage may be the ability to automatically reset the crowd gate when the holding pen is empty. The ability to automatically encourage dairy livestock to enter a milking parlor may increase efficiency by reducing milking times and reducing the amount of human intervention required to encourage dairy livestock to enter the milking parlor.

BRIEF DESCRIPTION OF THE DRAWINGS

For a more complete understanding of the present disclosure and its features and advantages, reference is now made to the following description, taken in conjunction with the accompanying drawings, in which:

FIG. 2 is a flowchart illustrating an example crowd gate control method.

DETAILED DESCRIPTION OF THE DISCLOSURE

Figure 1A:
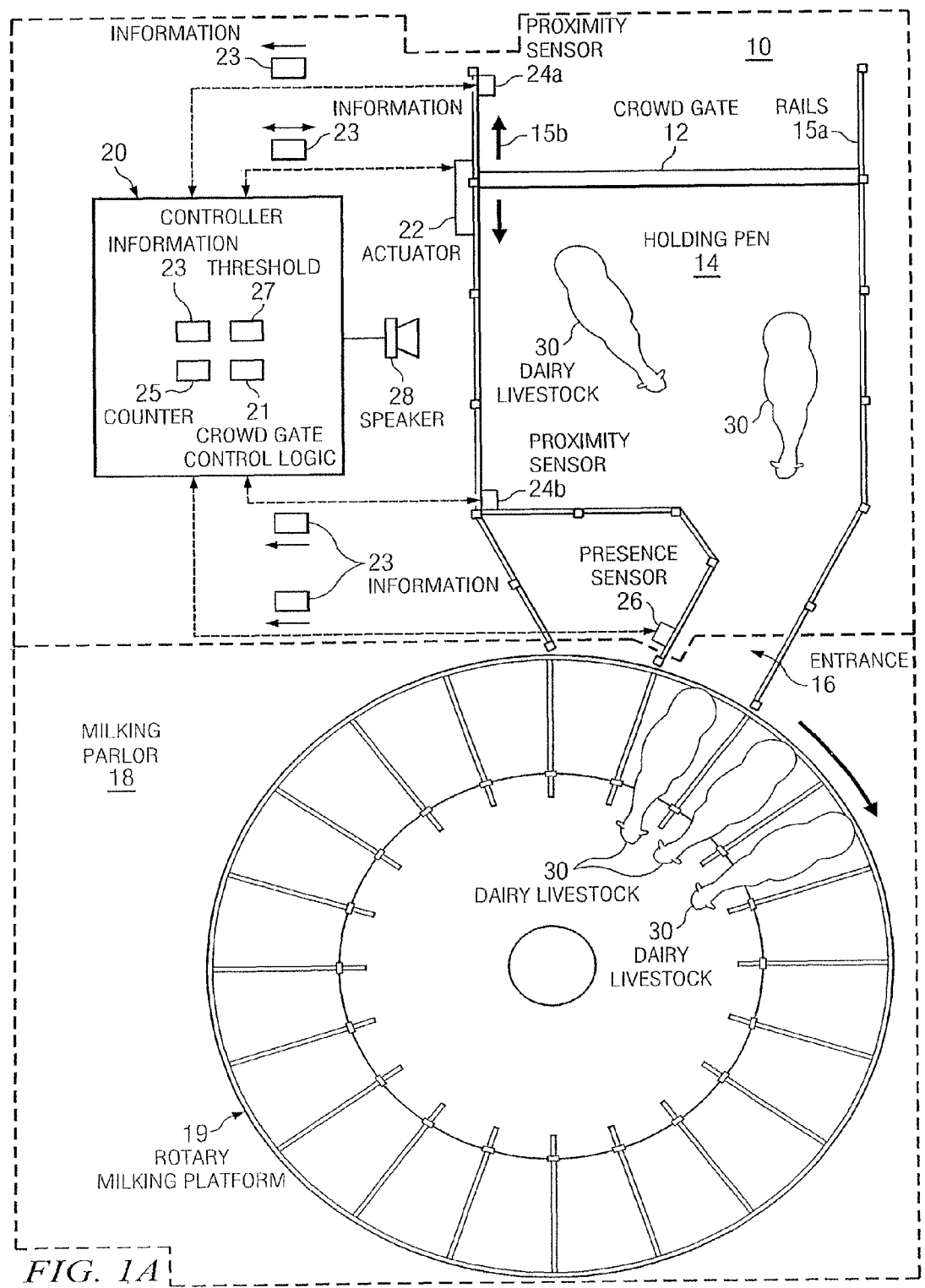
FIG. 1A is a top view diagram illustrating an example embodiment of a crowd gate control system.

FIG. 1A is a top view diagram illustrating an example embodiment of a crowd gate control system 10. System 10 includes a crowd gate 12, a holding pen 14, rails 15, and an entrance 16. Also shown is a milking parlor 18 that includes a rotary milking platform 19. In general, a group of dairy livestock 30, such as dairy cows, enter the holding pen 14 and wait for their turn to be milked, each in turn passing through entrance 16 to rotary milking platform 19. Crowd gate 12 is generally operable to move along rails 15 towards and away from entrance 16, thereby respectively decreasing and increasing the effective area of holding pen 14. System 10 also includes a controller 20, an actuator 22, proximity sensors 24a and 24b, a presence sensor 26, and a speaker 28. Controller 20 generally controls the operation of elements within system 10. For example, controller 20 may control the movement of crowd gate 12 in several modes of operation by sending and/or receiving information 23 to and/or from actuator 22, proximity sensors 24a and 24b, presence sensor 26, and speaker 28.

Crowd gate 12 represents any suitable configuration and geometry of structure and materials operable to form a side of holding pen 14 and move along rails 15 in order to encourage dairy livestock 30 to enter entrance 16 to rotary milking platform 19. Crowd gate 12 may include any number and combination of posts, poles, rods, connectors, cables, wires, and/or beams operable to form a substantially planar barricade such as a fence, wall, and/or any other appropriate structure to form a side of holding pen 14. In some embodiments, crowd gate 12 may be moved from a down position in which crowd gate forms a side of holding pen 14 to an up position in which an opening is created in holding pen 14 for the entry of dairy livestock 30. Although crowd gate 12 is detailed in conjunction with holding pen 14 and rotary milking platform 19, it should be understood that crowd gate 12 can be implemented in conjunction with any other type of equipment on a farm and/or dairy milking operation. For example, it may be used with other types of milking parlors besides a rotary milking parlor. It may also be used with equipment besides milking parlors altogether. Essentially, crowd gate 12 may be used in any application and with any equipment to facilitate the orderly movement of livestock from one place to another.

Holding pen 14 represents any suitable configuration and geometry of structures and materials operable to form a perimeter structure to serve as a waiting area for dairy livestock 30. Holding pen 14 may be located adjacent to entrance 16 to milking parlor 18. In some embodiments, holding pen 14 may form three sides of a roughly rectangular area. In various embodiments, holding pen 14 may include any number and combination of posts, poles, rods, connectors, cables, wires, and/or beams operable to form fencing, barricades, walls, and/or any other appropriate structure to form an enclosure. In an example embodiment, holding pen 14 may represent an approximately 40 foot by 100 foot area when crowd gate 12 is in a down position and moved to the end of rails 15 furthest from entrance 16. As used herein, down position refers to a position of crowd gate 12 in which crowd gate 12 forms a side of holding pen 14. The area of holding pen 14 may be reduced substantially to zero by moving the crowd gate 12 to the end of rails 15 closest to entrance 16.

Rails 15 represent any suitable configuration and geometry of sliding rails, ball joints, bearings, fittings, grooved surfaces, or other appropriate structure to move crowd gate 12 with respect to the floor of holding pen 14. Rails 15 may form one or more sides of holding pen 14, and/or rails 15 may be mounted on one or more sections of holding pen 14, such as two parallel sides of holding pen 14.

Entrance 16 represents any suitable configuration and geometry of structure and materials operable to control the entry of cows into a stall of rotary milking platform 19. In the illustrated embodiment, entrance 16 forms a funnel such that dairy livestock 30 may pass through the entrance one at a time. It should be understood, however, that any number of suitable types and configurations of entrances are within the scope of the present disclosure, including entrances that may allow any number of dairy livestock 30 to enter a milking parlor at one time. Entrance 16 may include any number and combination of posts, poles, rods, connectors, cables, wires, and/or beams operable to form gates, walls, fencing, swinging doors, and other appropriate structure to form an entrance to milking parlor 18.

Milking parlor 18 represents any suitable configuration and geometry of structure and materials to form a location in which dairy livestock 30 may be milked. For example, milking parlor 18 may represent a building, enclosure, or other structure that includes any suitable number and configuration of milking stalls. In the illustrated example, milking parlor 18 includes rotary milking platform 19.

Rotary milking platform 19 represents any suitable configuration and geometry of structure and materials operable to form a carousel of milking stalls that may rotate around a center point as dairy livestock 30 are milked. Rotary milking platform 19 may be configured such that a particular dairy livestock 30 entering entrance 16 may be appropriately milked in the time required to conclude one complete revolution of the carousel. It should be understood that while the illustrated embodiment depicts a rotary milking platform 19 in milking parlor 18, any number and types of milking parlors are within the scope of the present disclosure, including non-rotary and/or rectangular milking parlors.

Controller 20 represents any suitable combination of hardware, software, and controlling logic operable to control the operation of system 10. For example, controller 20 may receive information 23 from and/or transmit information 23 to actuator 22, proximity sensors 24a and 24b, presence sensor 26, and speaker 28. Controller 20 may include memory operable to store crowd gate control logic 21, information 23, counter 25, and threshold 27. Controller 20 may also include a central processing unit (CPU) operable execute crowd gate control logic 21 and one or more interfaces operable to transmit and receive information 23 to and from the various elements of system 10. In some embodiments, controller 20 includes a touch-screen display for entering commands and other information. In various embodiments, controller 20 includes a handheld controller with a series of push button inputs, in which a given sequence and/or combination of inputs may initiate a given mode of operation. Controller 20 may include a programmable logic controller, computer, and/or other appropriate controlling device. Logic may be encoded and/or embodied on a non-transitory and/or tangible computer readable medium.

Crowd gate control logic 21 represents any information, logic, and/or instructions stored and/or executed by controller 20 to control the operation of system 10. Crowd gate control logic 21 may include an appropriate sequence of instructions for controller 20 to operate crowd gate 12 in several modes of operation. The various modes may include operations that generally decrease the area of holding pen 14 in order to encourage dairy livestock 30 to enter entrance 16 and/or operations that generally increase the area of holding pen 14 to make room for another group of dairy livestock 30 to wait in holding pen 14. These various modes of operation may be initiated in response to one or more triggering events and/or conditions.

Actuator 22 represents any suitable combination of devices and/or logic operable to move crowd gate 12 and/or to transmit and receive information 23 from controller 20. Actuator 22 may include any number and combination of hydraulic cylinders, pneumatic devices, motors, pistons, pulleys, cables, chain driven assemblies and/or other appropriate actuators for moving crowd gate 12 in the desired manner.

Information 23 represents any information, logic, signals and/or instructions generated by the various elements of system 10. Information 23 may include signals, packets, and/or other data transmissions generated by controller 20, actuator 22, proximity sensors 24, and/or presence sensor 26.

Proximity sensors 24a and 24b represent any device capable of sensing the proximity of crowd gate 12, transmitting information 23 to and/or receiving information 23 from controller 20. In response to sensing the proximity of crowd gate 12, proximity sensor 24a or 24b may transmit a signal to controller 20. Proximity sensors 24a and 24b may represent stress sensors, pressure sensors, motion sensors, radio frequency identification (RFID) sensors, or any other appropriate sensors capable of detecting that crowd gate 12 is in a region near the proximity sensor. Proximity sensor 24a may be located near the end of holding pen 14 furthest from entrance 16. For example, proximity sensor 24a may indicate that crowd gate 12 is within six inches to one foot of the end of holding pen 14 furthest from entrance 16. Proximity sensor 24b may be located near entrance 16, such that proximity sensor 24b may indicate the proximity of crowd gate 12 to entrance 16. For example, proximity sensor 24b may indicate that crowd gate 12 is within six inches to one foot of entrance 16.

Counter 25 represents any parameter, variable, information, numerical data, integer value, or other indicator related to rotary milking platform 19 that may be used to determine when to initiate movement and/or terminate movement of crowd gate 12. For example, counter 25 may represent information indicating the number of dairy livestock 30 that have entered entrance 16. In the alternative or in addition, counter 25 may represent an amount of elapsed time. In some embodiments, counter 25 may be initiated and/or restarted after a given mode of operation has completed. Additionally or alternatively, counter 25 may indicate the number of dairy livestock 30 remaining in holding pen 14, thereby accounting for dairy livestock 30 yet to be milked on rotary milking platform 19.

Presence sensor 26 represents any device or sensor capable of detecting the presence of a livestock and transmitting information 23 to and/or receiving information 23 from controller 20. For example, presence sensor 26 may be operable to detect that a livestock has passed, is passing, or will pass through entrance 16 to rotary milking platform 19. Presence sensor 26 may represent an RFID sensor capable of detecting information stored in an RFID tag attached to a particular livestock, such as to the livestock's ear. In some embodiments, presence sensor 26 may represent a device capable of detecting that a gate in entrance 16 is opened or closed. Presence sensor 26 may represent any number and combination of motion detectors, stress sensors, pressure sensors, or any other appropriate device capable of sensing the presence of a dairy livestock 30 in entrance 16 and/or passing through entrance 16.

Threshold 27 represents any parameter, variable, information, numerical data, integer value, or other indicator associated with counter 25 and operable to indicate a condition, triggering threshold, and/or triggering event related to rotary milking platform 19. Threshold 27 may indicate a configurable number of dairy livestock 30 that have entered milking platform 19 to be milked. The configurable number may be based on the size of holding pen 14 and the amount of space required to hold a variable amount of dairy livestock 30. For example, in a 40 foot by 100 foot holding pen 14, a threshold 27 may be reached when ten cows have entered rotary milking platform 19. Threshold 27 may also be reached when information 23 received from proximity sensors 24 indicates the proximity of crowd gate 12 to an end of rails 15. In the alternative or in addition, threshold 27 may represent an amount of time.

Speaker 28 represents any device capable of emitting a warning that a given mode of operation is being initiated by controller 20 and/or that any mode of operation is occurring. While represented as a speaker, it should be understood that any manner of warning, including sound, light, or other visual and/or audible indication, is within the scope of the present disclosure.

In operation, a group of dairy livestock 30 selected for milking enter holding pen 14 from stables, fields, and/or other locations. While in holding pen 14, each of dairy livestock 30 waits for its respective turn to be milked. When a particular livestock's turn to be milked arrives, that livestock passes though entrance 16 into an available stall on rotary milking platform 19. Generally, controller 20 executes instructions stored in crowd gate control logic 21 to control the operation of crowd gate 12 in one or more modes of operation, which may generally move crowd gate 12 towards entrance 16, away from entrance 16, lower crowd gate 12 into the down position, and/or raise crowd gate 12 from the down position. According to a given mode of operation, the current group of dairy livestock 30 may be encouraged to enter rotary milking platform 19 and/or a new group of dairy livestock 30 may be allowed to enter holding pen 14 after the current group has entered rotary milking platform 19.

Actuator 22 may move crowd gate 12 in relation to entrance 16 on rails 15. Actuator 22 also may lift crowd gate 12 vertically from a down position in which it forms a side of holding pen 14 to an up position in which dairy livestock 30 may move beneath crowd gate 12. Additionally or alternatively, actuator 20 may move crowd gate 12 towards and away from entrance 16 in either the up or the down position. In response to a given command and/or signal from controller 20, actuator 22 may move crowd gate 20 along rails 15 towards and away from entrance 16, lift crowd gate 12 vertically from a down position to an up position, and/or lower crowd gate 12 vertically from an up position to a down position. Actuator 22 may be operable to sense resistance and/or apply limited amounts of pressure such that actuator 22 may cease the motion of crowd gate 12 if significant resistance is encountered. For example, actuator 22 may cease moving crowd gate 12 if a dairy livestock 30 is impeding the progress of crowd gate 12. In some embodiments, these functions may be performed by controller 20 based on feedback signals received from actuator 22.

Controller 20 may store threshold 27 related to triggering conditions that may initiate a given mode of operation, such as a triggering threshold 27 associated with counter 25. Controller 20 may receive information 23, such as a signal from presence sensor 26, and may update and/or increment the counter 25 according to the received information 23. Controller 20 may determine whether counter 25 has reached triggering threshold 27. When counter 25 reaches threshold 27, controller 20 may initiate a given mode of operation such as the exemplary forward mode of operation or the exemplary reverse mode of operation described below.

Controller 20 may initiate the exemplary forward mode of operation discussed below in response to determining that a configurable number of dairy livestock 30 have entered milking platform 19. Controller 20 may receive information 23, such as a signal from presence sensor 26, for each dairy livestock 30 detected in entrance 16. Controller 20 may then update counter 25 of the number of livestock entering the rotary milking platform 19. When counter 25 reaches the configurable number, controller 20 may initiate the exemplary forward mode of operation by sending an appropriate signal to actuator 22.

For example, due to the particular dimensions of dairy livestock 30 and holding pen 14, holding pen 14 may hold up to one hundred dairy livestock and/or it may be appropriate to initiate a forward mode of operation of crowd gate 12 after ten animals have entered rotary milking platform 19. Accordingly, threshold 27 is set to ten and counter 25 is set to zero. As rotary milking platform 19 turns, one of the hundred dairy livestock 30 in holding pen 14 may pass through entrance 16 to an available stall on rotary milking platform 19 and counter 25 may be incremented. After ten dairy livestock 30 have entered entrance 16, controller 20 may initiate the exemplary forward mode of operation described below.

As another example, due to the particular dimensions of holding pen 14 and dairy livestock 30, it may be appropriate to initiate a forward mode of operation of crowd gate 12 after an amount of time has elapsed, such as the time rotary milking platform 19 takes to rotate by ten stalls. Accordingly, threshold 27 is set to be the amount of time rotary milking platform 19 takes to rotate by ten stalls, and counter 25 is set to zero. If for any reason the rotation of rotary milking platform 19 is suspended and/or paused, counter 25 may be stopped accordingly. After counter 25 reaches threshold 27, controller 20 may initiate a forward mode of operation, such as the exemplary forward mode of operation described below.

Controller 20 may initiate the exemplary reverse mode of operation discussed below in response to determining that the position of crowd gate 12 should to be reset to the end of rails 15 furthest from entrance 16. Controller 20 may receive information 23, such as a signal from proximity sensor 24b, indicating the location of crowd gate 12 on rails 15 and/or that crowd gate 12 has reached the end of rails 15 closest to entrance 16. This signal may signify that all or most of dairy livestock 30 have entered rotary milking platform 19 and/or that a new group of dairy livestock 30 may enter entrance 16. When controller 20 determines that crowd gate 12 is near entrance 16, controller 20 may initiate the exemplary reverse mode of operation by sending an appropriate signal to actuator 22.

Additionally or alternatively, controller 20 may store an amount of time in counter 25 that indicates the elapsed time since the last mode of operation was initiated. Once the amount of time reaches a configurable length of time stored in threshold 27, controller 20 may initiate a given mode of operation such as the exemplary forward mode of operation and/or the exemplary reverse mode of operation discussed below.

When a given mode of operation is initiated, controller 20 may activate speaker 28 to sound an alarm to indicate that a movement of crowd gate 12 is about to occur and/or is occurring. This alarm may be visual and/or audible to alert dairy livestock 30, operators, and/or other personnel that a given mode of operation is being initiated and/or is in effect.

A given mode of operation may include any number, combination, and duration of steps, including moving crowd gate 12 towards entrance 16 for a variable amount of time and/or distance, moving crowd gate away from entrance 16 for a variable amount of time and/or distance, pausing for a variable amount of time, lifting crowd gate 12 from a down position to an up position, and/or lowering crowd gate 12 from an up position to a down position. By way of example, two exemplary modes of operation will be described: forward mode and reverse mode. Note, however, that any appropriate modes of operation may be utilized.

An exemplary forward mode of operation includes instructions to move crowd gate 12 generally towards entrance 16 and may include several steps. The forward mode of operation of crowd gate 12 generally decreases the area of holding pen 14, which may thereby encourage dairy livestock 30 to proceed towards entrance 16. The forward mode of operation may include moving crowd gate 12 towards entrance 16 when crowd gate 12 is in a down position.

A first step of an exemplary forward mode of operation may be moving crowd gate 12 from an up position to a down position, which may thereby enclose a group of dairy livestock 30 in holding pen 14.

A second step of an exemplary forward mode of operation may be a pre-forward reverse step, in which crowd gate 12 moves away from entrance 16 for a period of time (e.g., a time between 0 and 10 seconds, such as 2 seconds). The pre-forward reverse step may alert dairy livestock 30 that a forward step is coming and/or may alert any dairy livestock 30 that may be resting or leaning against crowd gate 12 to move away from crowd gate 12.

A third step of an exemplary forward mode of operation may be a pause step, in which the movement of crowd gate is ceased for a period of time (e.g., a time between 0 and 10 seconds, such as 1 second). The pause step may give dairy livestock 30 an appropriate time to react to the pre-forward reverse step.

A fourth step of an exemplary forward mode of operation may be a forward step, in which crowd gate 12 moves towards entrance for a period of time (e.g., a time between 1 and 60 seconds, such as 10 seconds). The forward step may encourage dairy livestock 30 to move towards entrance 16 to rotary milking platform 19 by decreasing the effective area of holding pen 14.

A fifth step of an exemplary forward mode of operation may be another pause step, in which in which the movement of crowd gate is ceased for a period of time (e.g., a time between 0 and 10 seconds, such as 1 second). The pause step may give dairy livestock 30 an appropriate time to react to the forward step.

A sixth step of an exemplary forward mode of operation may be a post-forward reverse step, in which crowd gate 12 moves away from entrance 16 for a period of time (e.g., a time between 0 and 10 seconds, such as 2 seconds). The post-forward reverse step may give dairy livestock 30 room to settle within the confines of the area of holding area 14 reduced by the forward mode of operation.

Accordingly, the exemplary forward mode of operation may encourage dairy livestock 30 to move towards entrance 16 and/or may do so without startling, agitating, and/or harming dairy livestock 30. The exemplary forward mode of operation may train dairy livestock 30 over time to move forward towards entrance 16 on their own when the forward mode of operation is initiated. While an exemplary forward mode of operation has been described with particular steps and particular duration ranges, it should be understood that any appropriate forward modes of operation are within the scope of the present disclosure. For example, certain times may be set to zero and/or certain steps may be omitted. In particular, some embodiments may omit the pre-forward reverse step and/or the post-forward reverse step.

An exemplary reverse mode of operation includes instructions to move crowd gate 12 generally away from entrance 16 and may include several steps. The reverse mode of operation may include resetting the position of crowd gate 12 from the end of rails 15 nearest entrance 16 to the end of the rails 15 furthest from entrance 16, which may thereby allow a new group of dairy livestock 30 to enter holding pen 14.

A first step of the exemplary reverse mode of operation may be a lifting step, in which crowd gate 12 is lifted from a down position to an up position. The lifting step may allow a new group of dairy livestock 30 to pass beneath crowd gate 12 during the remaining steps of the exemplary reverse mode of operation.

A second step of the exemplary reverse mode of operation may be a reset step, in which crowd gate 12 is moved away from entrance 16 until controller 20 receives a signal from proximity sensor 24a indicating the proximity of crowd gate 12 to the end of rails 15 furthest from entrance 16. The reset step may thus increase the effective area of holding pen 14 and/or thereby allow a new group of dairy livestock 30 to enter entrance 16.

While particular steps of particular durations and duration ranges have been described with respect to an exemplary forward mode of operation and an exemplary reverse mode of operation, it should be understood that any number of steps and/or modes of operation are within the scope of the present disclosure. While particular times for steps have been provided as examples, any amounts of time that satisfactorily encourage dairy livestock 30 to move forward towards rotary milking platform 19 may be used. For example, times may vary based on the size and configuration of holding pen 14 and the speed of movement of crowd gate 12. In addition or in the alternative times may vary based on the number of livestock that have entered entrance 16 and/or how much space is approximately available in holding pen 14.

Controller 20 may be configured and/or programmed to store various modes of operations. For example, any number and variations of modes of operations may be transmitted to controller 20 via a touch-screen interface and/or appropriate network interface. Controller 20 may accordingly execute stored modes of operation in any of the previously described manners.

Controller 20 may include a manual override mode in which an operator may control the motion of crowd gate 12 manually by entering commands. For example, an operator may initiate a given mode of operation such as the exemplary forward mode of operation or the exemplary reverse mode of operation previously described via a touch screen interface and/or by pushing an appropriate sequence of buttons on the face of a handheld device or controller. Additionally or alternatively, an operator may, through entering an appropriate sequence of commands, manually control each step of a given mode of operation.

Various modifications may be made to the crowd gate control system described in the present disclosure. For example, while proximity sensors 24 and lengths of time are disclosed, the movement of crowd gate 12 may be detected in any number of appropriate ways including determining that crowd gate 12 has moved a predetermined distance along rails 15. In some embodiments, actuator 22 may cease moving crowd gate 12 forward in response to detecting that crowd gate 12 has impacted non-moving dairy livestock 30. In such cases, actuator 22 may be operable to keep a configurable amount of pressure on the non-moving dairy livestock 30, thereby encouraging the animal to move without forcing the animal to move. Additionally or alternatively, holding pen 14 may be of any appropriate size to hold any number of dairy livestock 30. In some embodiments, holding pen 14 may include four sides of a rectangular enclosure and crowd gate 12 may represent a movable barricade within holding pen 14. In alternate embodiments, entrance 16 to holding pen 14 may be on one of the sides of the holding pen 14, such that when crowd gate 12 is in a position on rails 15 furthest from to entrance 16 to rotary milking platform 19, dairy livestock 30 may enter into holding pen 14 in between crowd gate 12 and entrance 16. Additionally, the length and duration ranges of any given mode of operation may be based on the number of dairy livestock 30 in the holding pen 14 and/or on rotary milking platform 19 at any given time.

Figure 1B:
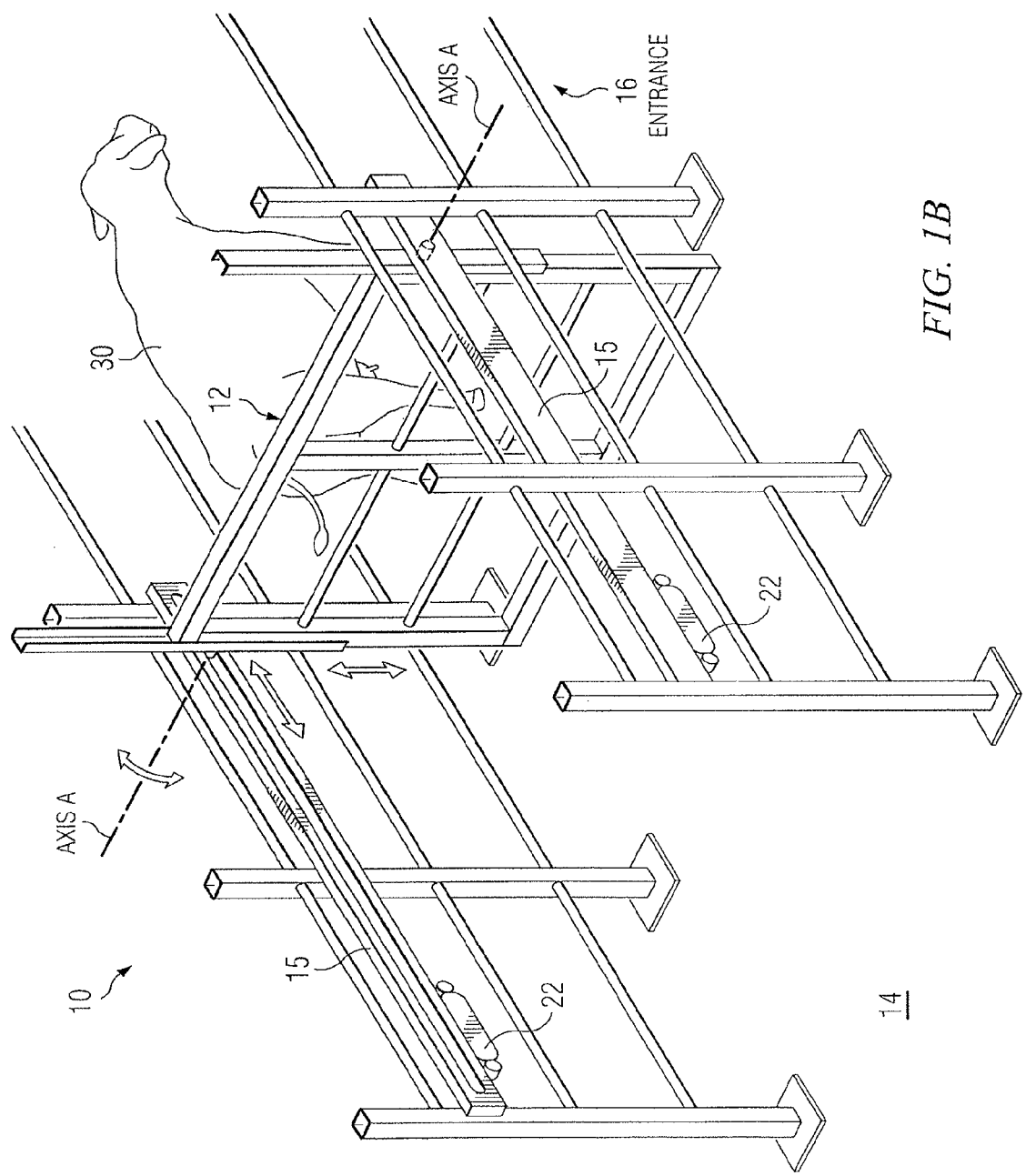
FIG. 1B is a perspective view illustrating an example embodiment of a crowd gate control system.

FIG. 1B is a perspective view illustrating example embodiments of elements of crowd gate control system 10. As illustrated, crowd gate 12 is operable to move on rails 15 in relation to entrance 16. In the illustration, crowd gate 12 is shown in a down position in which crowd gate 12 forms a side of holding pen 14. As previously stated, actuator 22 may move crowd gate 12 along rails 15 towards and away from entrance 16, lift crowd gate 12 vertically from the illustrated down position to an up position, and/or lower crowd gate 12 vertically from an up position to a down position as illustrated by the directional arrows. Moving crowd gate 12 into an up position from a down position may thereby form an opening in holding pen 14 for the entry of dairy livestock 30. Moving crowd gate 12 to a down position from an up position may thereby enclose a group of dairy livestock 30 in holding pen 14. Accordingly, dairy livestock 30 may be encouraged to enter entrance 16 when controller 20 initiates a given mode of operation of crowd gate 12.

In some embodiments, crowd gate 12 may be moved from a down position to an up position by rotating on a pivot along Axis A, such that crowd gate 12 is rotated from a substantially vertical position with respect to the floor of holding pen 14 to a substantially horizontal position with respect to the floor of holding pen 14. Crowd gate 12 may also be moved from an up position to a down position by rotating on a pivot along Axis A, such that crowd gate 12 is rotated from a substantially horizontal position with respect to the floor of holding pen 14 to a substantially vertical position with respect to the floor of holding pen 14.

FIG. 2 is a flowchart illustrating an example crowd gate control method 200. Method 200 begins at step 202, in which a triggering threshold is stored. For example, a triggering threshold may be a configurable number of dairy livestock 30 that have entered rotary milking platform 19, which indicates crowd gate 12 should be moved forward.

At step 204, a determination is made whether a manual override has been selected. If the manual override has not been selected, method 200 continues to step 206, in which information 23 may be received. For example, a signal may be received from a presence sensor 26 indicating that a particular one of dairy livestock 30 has entered rotary milking platform 19.

After information 23 is received at step 206, a parameter associated with the triggering threshold is updated with the received information at step 208. For example, counter 25 may be incremented that indicates the number of dairy livestock 30 that have entered rotary milking platform 19 since the last movement of crowd gate 12.

At step 210, a determination is made whether the parameter has reached the triggering threshold that was stored at step 202. For example, the number of cows that have entered entrance 16 may have reached the configured number stored in threshold 27, indicating that crowd gate 12 should be moved forward. If the threshold has not been reached, method 200 returns to step 204.

If the parameter has reached the triggering threshold at step 210, however, method 200 continues to step 212 and a first mode of operation is initiated. For example, the first mode of operation may be the previously described exemplary forward mode of operation, which may include a pre-forward reverse step at step 214, a pause step at step 216, a forward step at step 218, a second pause step at step 220, and a post-forward reverse step at 222. These steps may proceed for any suitable duration and/or duration ranges, such as those previously described with respect to the exemplary forward mode of operation.

The parameter is reset at step 224. For example, counter 25, which indicates the number of dairy livestock 30 that have entered rotary milking platform 19 since the last movement of crowd gate 12, may be reset to zero. At step 226, a determination is made whether crowd gate 12 has reached entrance 16. This determination may be based on receiving information 23, such as a signal from proximity sensor 24b, that crowd gate 12 is near entrance 16. If crowd gate 12 has not reached entrance 16, method 200 returns to step 204.

If crowd gate 12 has reached entrance 16, a second mode of operation is initiated at step 230. For example, the second mode of operation may be the previously described exemplary reverse mode of operation. Crowd gate 12 is lifted from a down position to an up position at step 232, and crowd gate 12 is reset at step 234. Step 234 may include moving crowd gate 12 to the end of rails 15 furthest from entrance 16. Step 234 may include allowing a new group of dairy livestock 30 to enter holding pen 14.

At step 236, crowd gate 12 is lowered to a down position. Step 236 may include enclosing a new set of dairy livestock 30 into holding pen 14. After the completion of step 236, method 200 returns to step 204.

If, at step 204, a manual override is selected, a determination is made at step 238 whether the manual override selection is for the first mode of operation or the second mode of operation. If the first mode of operation has been selected, method 200 proceeds to step 212. If the second mode of operation has been selected, however, method 200 proceeds to step 230. In the alternative or in addition, particular movements of crowd gate 12 may be manually selected. For example, movement up, down, towards entrance 16, and/or away from entrance 16 may be selected.

The preceding flowchart illustrates a particular method of crowd gate control. However, this flowchart illustrates only an exemplary method of operation, and system 10 contemplates individuals and/or devices using any suitable techniques, elements, and applications for performing these functions. Thus, many of the steps in the flowchart may take place simultaneously and/or in difference orders than shown. In addition, methods may include additional steps or fewer steps, so long as the methods remain appropriate. Moreover, one or more devices of system 10 may work independently and/or in conjunction with other elements of system 10 to control crowd gate 12.

Although the present invention has been described with several embodiments, a myriad of changes, variations, alterations, transformations, and modifications may be suggested to one skilled in the art and it is intended that the present invention encompass such changes, variations, alterations, transformations, and modifications as fall within the scope of the appended claims.

What is claimed is:

1. A crowd gate control system, comprising:
a holding pen for dairy livestock, wherein the holding pen is adjacent to an entrance to a rotary milking parlor, the rotary milking parlor rotating such that a plurality of milking stalls rotate past the adjacent entrance;
a crowd gate comprising an actuator, wherein the crowd gate is positioned at a side of the holding pen and is operable to move forward and backward in relation to the entrance to the milking parlor such that moving the crowd gate from its position at a side of the holding pen toward the entrance of the rotary milking parlor reduces the effective area of the holding pen;
a counter that measures an elapsed amount of time associated with the rotation of the rotary milking parlor; and
a controller in communication with the actuator and programmed to control the movement of the crowd gate, wherein the controller:
stores a triggering threshold;
determines that the counter has reached the a triggering threshold; and
in response to the counter reaching the triggering threshold, the crowd gate performs a pre-forward reverse movement in which the crowd gate initially moves in reverse away from the entrance prior to moving forward towards the entrance such that the effective size of the pen first increases in area prior to further decreasing in area.

2. The system of claim 1, wherein the crowd gate pauses after it initially moves backward and before it moves forward toward the entrance to the milking parlor.

3. The system of claim 2, wherein the crowd gate pauses after it moves forward toward the entrance to the milking parlor and then the crowd gate again moves backward away from the entrance to the milking parlor.

4. The system of claim 1, wherein:
the crowd gate rises from a down position in which the crowd gate forms a side of the holding pen to an up position in which the crowd gate forms an opening in the holding pen; and
after the crowd gate rises, the crowd gate moves to an end of the holding pen distal from the entrance of the milking parlor.

5. The system of claim 4, further comprising:
a proximity sensor located at an end of the holding pen proximate to the entrance to the milking parlor; and
wherein the crowd gate rises in response to the proximity sensor sensing that the crowd gate is proximate to the entrance of the milking parlor.

6. The system of claim 1, further comprising a speaker operable to sound an alarm to indicate the initiation of the pre-forward reverse movement.

7. The system of claim 1, wherein the controller is further operable to:
receive a manual override signal; and
initiate the pre-forward reverse movement of the crowd gate in response to receiving the manual override signal.

8. A crowd gate control system, comprising:
a holding pen for dairy livestock, wherein the holding pen is adjacent to an entrance to a milking parlor;
a crowd gate comprising an actuator, wherein the crowd gate is positioned at a side of the holding pen and operable to move forward and backward in relation to the entrance to the milking parlor such that moving the crowd gate from its position at a side of the holding pen toward the entrance of the rotary milking parlor reduces the effective area of the holding pen;
a presence sensor capable of detecting the presence of a dairy livestock and that generates and transmits information indicating that dairy livestock should enter the rotary milking parlor; and
a controller in communication with the actuator and the presence sensor, wherein the controller is programmed to control the movement of the crowd gate and to determine whether the dairy livestock recognized by the presence sensor should enter the milking parlor in response to the information generated and transmitted by the presence sensor;
wherein in response to the controller determining that the dairy livestock should enter the milking parlor, the crowd gate performs a pre-forward reverse movement in which the crowd gate initially moves in reverse away from the entrance prior to the crowd gate moving forward towards the entrance to the milking parlor such that the effective size of the pen first increases in area prior to further decreasing in area.

9. The system of claim 8, wherein the crowd gate pauses after it initially moves backward and before it moves forward toward the entrance to the milking parlor.

10. The system of claim 9, wherein the crowd gate pauses after it moves forward toward the entrance to the milking parlor and then the crowd gate again moves backward away from the entrance to the milking parlor.

11. The system of claim 8, further comprising:
   a proximity sensor located at an end of the holding pen proximate to the entrance to the milking parlor; and
   wherein in response to the proximity sensor sensing that the crowd gate is proximate to the entrance of the milking parlor:
      the crowd gate rises from a down position in which the crowd gate forms a side of the holding pen to an up position in which the crowd gate forms an opening in the holding pen; and
      after the crowd gate rises, the crowd gate moves to an end of the holding pen distal from the entrance of the milking parlor.

12. The system of claim 8, further comprising a speaker operable to sound an alarm to indicate the initiation of the pre-forward reverse movement.

13. The system of claim 8, wherein the controller is further operable to:
   receive a manual override signal; and
   initiate the pre-forward reverse movement of the crowd gate in response to receiving the manual override signal.

* * * * *